US009882987B2

(12) United States Patent
Kodaypak et al.

(10) Patent No.: US 9,882,987 B2
(45) Date of Patent: Jan. 30, 2018

(54) DYNAMICALLY SWITCHING USER EQUIPMENT CATEGORIES FOR ADAPTIVE MOBILE COMMUNICATIONS

(71) Applicant: AT&T Intellectual Property I, L.P., Atlanta, GA (US)

(72) Inventors: Rajendra Prasad Kodaypak, Sammamish, WA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/939,049

(22) Filed: Nov. 12, 2015

(65) Prior Publication Data

US 2017/0142204 A1  May 18, 2017

(51) Int. Cl.
| | | |
|---|---|---|
| H04M 1/00 | (2006.01) | |
| H04L 29/08 | (2006.01) | |
| H04W 8/08 | (2009.01) | |
| H04W 72/04 | (2009.01) | |
| H04W 4/00 | (2009.01) | |
| H04W 88/06 | (2009.01) | |

(52) U.S. Cl.
CPC ............ *H04L 67/12* (2013.01); *H04W 4/001* (2013.01); *H04W 8/08* (2013.01); *H04W 72/0406* (2013.01); *H04W 88/06* (2013.01)

(58) Field of Classification Search
CPC .............................. H04W 76/046; H04W 8/24
USPC ...................................................... 455/552.1
See application file for complete search history.

(56) References Cited

U.S. PATENT DOCUMENTS

| | | | |
|---|---|---|---|
| 7,079,015 B2 | 7/2006 | Gibeau | |
| 7,359,771 B2 | 4/2008 | Soulie et al. | |
| 8,145,199 B2 | 3/2012 | Tadayon et al. | |
| 8,495,196 B2 | 7/2013 | Harrang et al. | |
| 8,498,362 B2 | 7/2013 | Zhang et al. | |
| 8,571,551 B1 | 10/2013 | Bertz et al. | |

(Continued)

FOREIGN PATENT DOCUMENTS

| | | |
|---|---|---|
| EP | 2501200 | 9/2012 |
| EP | 2830369 | 1/2015 |

(Continued)

OTHER PUBLICATIONS

"Advancing Telematics and V2X for tomorrow," Telematics, QUALCOMM, retrieved at https://www.qualcomm.com/products/snapdragon/automotive/telematics on Jul. 15, 2015.

(Continued)

*Primary Examiner* — Timothy Pham
(74) *Attorney, Agent, or Firm* — Hartman & Citrin LLC

(57) ABSTRACT

Concepts and technologies disclosed herein are directed to dynamically switching user equipment ("UE") categories for adaptive mobile communications. According to one aspect of the concepts and technologies disclosed herein, a connected car device can determine whether it is operating in an idle mode or a connected mode. Based upon whether the connected car device is operating in the idle mode or the connected mode, the connected car device can determine an active UE category from a set of available UE categories. The connected car device can send the active user equipment category to a base station.

20 Claims, 9 Drawing Sheets

(56) References Cited

U.S. PATENT DOCUMENTS

| | | |
|---|---|---|
| 8,606,257 B2 | 12/2013 | Li |
| 8,634,826 B1 | 1/2014 | Cope et al. |
| 8,655,307 B1 | 2/2014 | Walker et al. |
| 9,031,498 B1 | 5/2015 | Bertz et al. |
| 2005/0143146 A1 | 6/2005 | Kim |
| 2008/0099563 A1 | 5/2008 | Wormald et al. |
| 2010/0234071 A1 | 9/2010 | Shabtay et al. |
| 2011/0053506 A1 | 3/2011 | Lemke et al. |
| 2012/0087303 A1* | 4/2012 | Kwon ............ H04W 48/10 370/328 |
| 2012/0173900 A1 | 7/2012 | Diab et al. |
| 2012/0196544 A1 | 8/2012 | Bolingbroke |
| 2013/0219039 A1 | 8/2013 | Ricci |
| 2014/0031010 A1* | 1/2014 | Wuergler ........ H04W 4/046 455/411 |
| 2014/0045497 A1* | 2/2014 | Abe ............ H04L 1/0067 455/435.1 |
| 2014/0207338 A1 | 7/2014 | Healey et al. |
| 2014/0219170 A1* | 8/2014 | Zhao ............ H04W 8/24 370/328 |
| 2014/0244156 A1 | 8/2014 | Magnusson et al. |
| 2014/0309885 A1 | 10/2014 | Ricci |
| 2014/0369308 A1 | 12/2014 | Gerstenberger et al. |
| 2015/0055564 A1 | 2/2015 | Alam et al. |
| 2015/0071137 A1 | 3/2015 | Thiam et al. |
| 2016/0105873 A1* | 4/2016 | Gaal ............ H04L 5/0005 370/330 |
| 2016/0277981 A1* | 9/2016 | Sunell ............ H04W 36/005 |

FOREIGN PATENT DOCUMENTS

| | | |
|---|---|---|
| WO | WO 2013083198 | 6/2013 |
| WO | WO 2015012653 | 1/2015 |

OTHER PUBLICATIONS

Sturman et al., "LTE for automotive applications," whitepaper, Jun. 2014, u-blox AG.

Blaser et al., "M2M service providers and LTE: new revenue opportunities," whitepaper, Nov. 2013, u-blox AG.

\* cited by examiner

DYNAMICALLY SWITCHING USER EQUIPMENT CATEGORIES FOR ADAPTIVE MOBILE COMMUNICATIONS

BACKGROUND

Wireless network service providers, also known as mobile network operators, have been enjoying extensive growth in network user population and subscriptions. The majority of user equipment ("UE") operating on mobile networks are mobile devices such as basic phones, smartphones, tablets, and the like. Mobile network operators utilize UE category information to allow radio access components, such as eNodeBs ("eNBs") to communicate effectively with all UEs connected thereto. Currently, the UE categories defined in Third Generation Partnership Project ("3GPP") Release 12 Technical Specification 36.306 are based upon a combined uplink and downlink capability.

New, non-traditional device types are now emerging, particularly with the growing interest in machine-to-machine ("M2M") devices and the Internet of Things ("IoT"). It is becoming increasingly challenging for mobile network operators to service effectively the variety of device types and sheer number of devices that, within the next few years, likely will increase to several billion devices worldwide. Moreover, non-traditional device types will likely have distinctly divergent characteristics, including, for example, mobility characteristics (e.g., low, medium, or high mobility), bit rate characteristics (e.g., low, medium, or high bit rate), transmission frequency (e.g., hourly, daily, monthly, or upon request), transceiver characteristics, antenna characteristic, and the like. Non-traditional device types also will likely have distinctly divergent requirements, including bandwidth requirements, delay requirements, jitter requirements, battery life requirements, and the like. These divergent characteristics and divergent requirements will require different treatment by mobile network operators.

SUMMARY

Concepts and technologies described herein relate to dynamically switching UE categories for adaptive mobile communications. According to one aspect of the concepts and technologies disclosed herein, a connected car device can determine whether it is operating in an idle mode or a connected mode. Based upon whether the connected car device is operating in the idle mode or the connected mode, the connected car device can determine an active UE category from a set of available UE categories. The connected car device can send the active user equipment category to a base station.

In some embodiments, when in idle mode, the connected car device can select a lowest available UE category in the set of available UE categories. The lowest available UE category can include, for example, a 3GPP category 0, a 3GPP category 1, a 3GPP category M, or any other lower category that may be proposed in the 3GPP standards.

In some embodiments, when in connected mode, the connected car device can select a highest available UE category in the set of available UE categories. The highest available UE category can include, for example, a 3GPP category 12.

In some embodiments, the connected car device can, when in the connected mode, determine an application communication requirement of a connected car application. In these embodiments, determining the active user equipment category for the connected car device from the set of available user equipment categories is further based upon the application communication requirement.

In some embodiments, the connected car device can, when in the connected mode, determine a mobility state of the connected car device. In these embodiments, determining the active user equipment category for the connected car device from the set of available user equipment categories is further based upon the mobility state.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
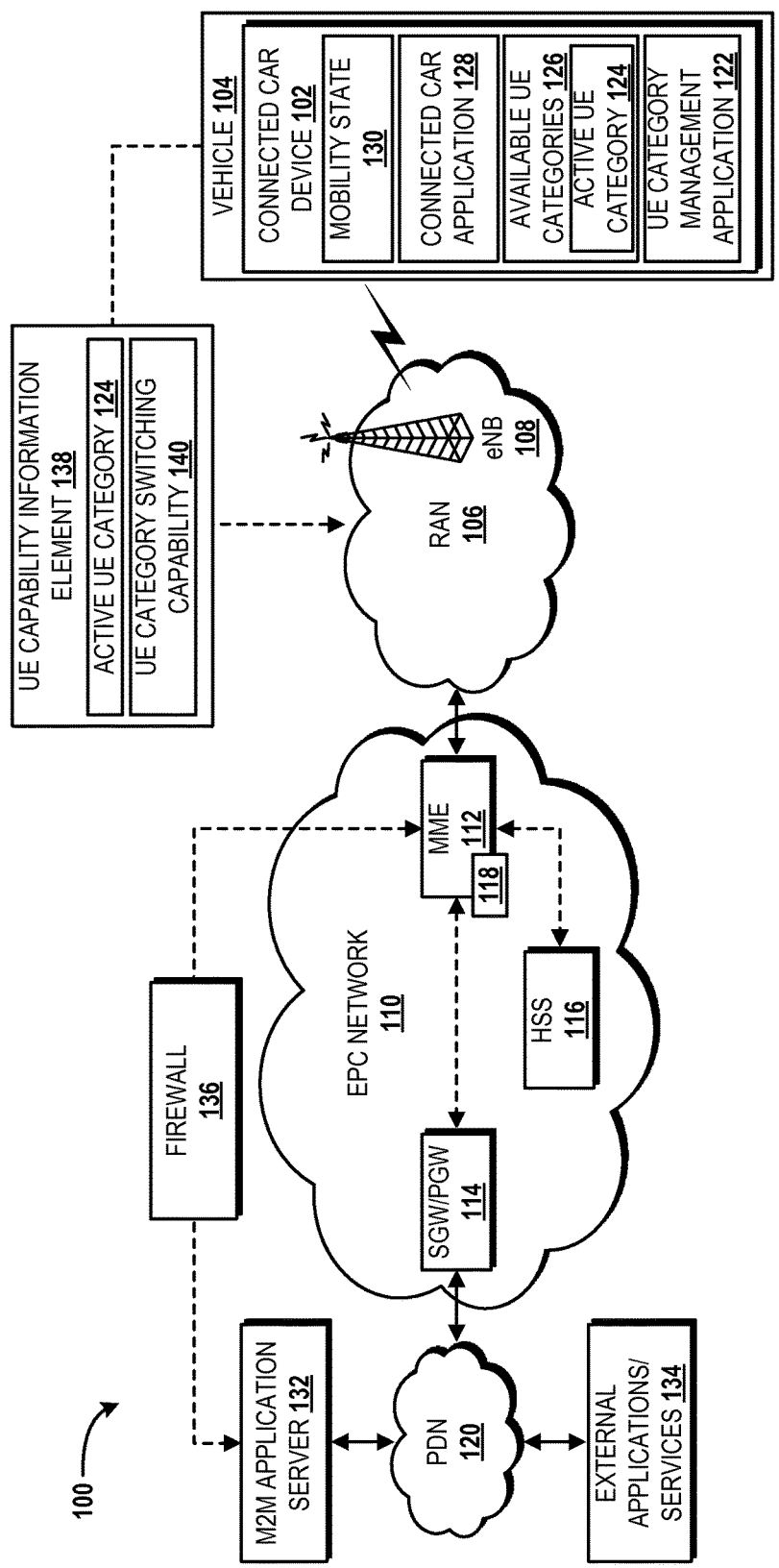
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, M2M devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of dynamically switching UE categories for adaptive mobile communications will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a connected car device 102 operating in a vehicle 104. The connected car device 102, as used herein, is a device capable of communication with a radio access network ("RAN") 106 for voice and/or data communications in accordance with one or more mobile telecommunications standards disclosed herein in support, at least in part, of a connected car, such as, but not limited to, navigation, entertainment, remote access (e.g., remote door lock/unlock, remote vehicle tracking, theft alerts, and the like), safety, vehicle management, fleet vehicle management, vehicle maintenance service (e.g., dealer and/or server center interface), and the like. In the illustrated embodiment, the RAN 106 operates in accordance with Long-Term Evolution ("LTE"), although those skilled in the art will appreciated the applicability of the concepts and technologies disclosed to other mobile telecommunications standards.

The connected car device 102 can be independent of the vehicle 104 or can be integrated within the vehicle 104. In some embodiments, the connected car device 102 is integrated within the vehicle 104, such as part of a vehicle entertainment system (not shown; also commonly referred to as "infotainment system"), a vehicle navigation system, a vehicle engine control unit ("ECU"), and/or another computing system of the vehicle 104. The connected car device 102 can be retrofitted into the vehicle 104 as aftermarket equipment or can be made available as standard or optional original equipment manufacturer ("OEM") equipment of the vehicle 104. In some embodiments, the connected car device 102 is independent of and configured to communicate with the vehicle 104 via a wired connection, such as, but not limited to, universal serial bus ("USB"), or via a wireless connection, such as, but not limited to, BLUETOOTH.

The vehicle 104 can be a car, truck, van, motorcycle, moped, go-kart, golf cart, or any other ground-based vehicle configured to transport one or more passengers and/or cargo. The vehicle 104 can include other vehicles such as boats, airplanes, helicopters, and the like. As such, the vehicle 104 embodied as a car in the description of the concepts and technologies disclosed herein is merely illustrative, and therefore should not be construed as being limiting in any way.

Although the illustrated embodiment is of a connected car device 102, other M2M devices that might form, at least in part, an IoT network (not shown) are contemplated. IoT is a concept of making physical objects, collectively "things," also referred to herein as M2M devices, network addressable to facilitate interconnectivity for the exchange of data. As such, M2M devices can be or can include any "thing" that is configured to be network addressable so as to connect to and communicate with one or more networks, such as the RAN 106, over which to communicate with other connected devices, including, for example, computers, smartphones, tablets, vehicles, other M2M devices, combinations thereof, and the like. Moreover, M2M devices can be deployed for consumer use, business use, and can find application in many industry-specific use cases. For example, M2M devices may find at least partial application in the following industries: automotive as in the illustrated embodiment using the connected car device 102; energy; healthcare; industrial; retail; and smart buildings/homes. Those skilled in the art will appreciate the applicability of M2M-solutions to other industries as well as consumer and business use cases. For this reason, the applications of M2M devices described herein are used merely to illustrate some example application of M2M devices, and therefore should not be construed as being limiting in any way.

The RAN 106, can include one or more service areas (which may also be referred to herein as "cells") having the same or different cell sizes, which may be represented by different cell-types. As used herein, a "cell" refers to a geographical area that is served by one or more base stations operating within an access network. The cells within the RAN 106 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, a MSMC cell-type, and a white space network cell-type. For ease of explanation, a "small cell" cell-type is utilized herein to collectively refer to a group of cell-types that includes femto cell-type (e.g., home eNode-B), pico cell-type, and micro cell-type, in general contrast to a macro cell-type, which offers a larger coverage area. Other cell-types, including proprietary cell-types and temporary cell-types are also contemplated. Although in the illustrated example the connected car device 102 is shown as being in communication with one RAN (i.e., the RAN 106), the connected car device 102 may be in communication with any number of access networks, including networks that incorporate collocated WWAN WI-FI and cellular technologies, and as such, the connected car device 102 can be a dual-mode device.

As used herein, a "base station" refers to a radio receiver and/or transmitter (collectively, transceiver) that is/are configured to provide a radio/air interface over which one or more M2M devices, such as the connected car device 102, can connect to a network. Accordingly, a base station is intended to encompass one or more base transceiver stations ("BTSs"), one or more NodeBs, one or more eNodeBs ("eNBs"), one or more home eNBs, one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the connected car device 102. In the illustrated embodiment, the RAN 106 includes an eNB 108. The eNB 108 is capable of communicating with the connected car device 102 and one or more other devices (not shown).

The RAN 106 might operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The RAN 106 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the connected car device 102. Data communications can be provided in part by the RAN 106 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 106 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will be described in context of an LTE environment, although those skilled in the art will appreciate the applicability of the concepts and technologies disclosed herein to other cellular technologies, including, in particular, those captured within future generation 3GPP standards.

The RAN 106 is shown as being in communication with an evolved packet core ("EPC") network 110. The illustrated EPC network 110 includes a mobility management entity ("MME") 112, a combination serving gateway ("SGW") and packet data networks ("PDN") gateways ("PGW") ("S/PGW") 114, and a home subscriber server ("HSS") 116. The EPC network 110 can include other network elements not shown in the illustrated embodiment. As such, the illustrated embodiment should not be construed as being limiting in any way.

The MME 112 controls signaling related to mobility and security for E-UTRAN (e.g., the RAN 106) access by the connected car device 102 and other devices (not shown). The SGW portion of the S/PGW 114 provides a point of interconnect between the radio-side (e.g., the RAN 106) and the EPC network 110. An SGW serves the connected car device 102 (and other UEs not shown) by routing incoming and outgoing IP packets. The PGW portion of the S/PGW 114 interconnects the EPC network 110 and one or more external IP networks, such as, in the illustrated embodiment, a PDN 120. A PGW routes IP packets to and from the PDN 120. A PGW also performs operations such as IP address/IP prefix allocation, policy control, and charging. In some implementations, a PGW and an SGW are deployed as independent network components rather than being combined as in the illustrated embodiment. The HSS 116 is a database that contains user/subscriber information. The HSS 116 also performs operations to support mobility management, call and session setup, user authentication, and access authorization.

The illustrated MME 112 includes a set of UE categories 118 ("UE categories 118"). The UE categories 118 are utilized by the MME 112 to inform eNBs, such as the eNB 108, to effectively communicate with UEs, such as the connected car device 102, based on performance requirements. The MME 112 can send the UE categories 118 to the eNB 108 (and other eNBs not shown) so that the eNB 108 can communicate correctly with the connected car device 102 as well as other UEs, such as mobile phones, tablets, and the like (also not shown).

In accordance with the concepts and technologies disclosed herein, the UE categories 118 can include UE categories defined in 3GPP Release 12 Technical Specification 36.306—specifically, in tables 4.1-1 through 4.1.5. Some of the most common and widely used UE categories in 3GPP are category 3 and category 4. There are other UE categories defined by 3GPP standards and could be used by mobile service providers in commercial network deployments depending on specific application/service roll out requirements. It is contemplated that the UE categories 118 can be updated to include other UE categories described in future 3GPP Releases.

In each of the UE categories 118, there are several parameters that define UE-specific performance, most noticeably the combined downlink and uplink data throughput capability. UE categories, such as category 0, are defined by 3GPP specifically for low power and low data rate applications such as M2M/IoT devices. The data bandwidth supported by such UE categories depends upon LTE modem complexity and chipset implementation capabilities to be able to process specific channel bandwidths. Millions of M2M capable wireless devices targeted for global connectivity over LTE networks might need low power and low bandwidth UE category requirements to maintain a significantly low cost chipset/modem complexity with extended battery life to drive down a large scale cost-effective adoption model across various industry verticals.

In accordance with the concepts and technologies disclosed herein, certain classes of M2M devices, such as a connected car class to which the connected car device 102 belongs, can utilize a UE category management application 122 to change an active UE category 124 from a set of available UE categories ("available UE categories") 126 to another UE category of the available UE categories 126 based upon various criteria. This criteria can include UE mode (i.e., connected mode or idle mode, an example of which is described below with reference to FIG. 3), one or more application communication requirements of a connected car application 128 (an example of which is described below with reference to FIG. 4), a mobility state 130 of the connected car device 102 (an example of which is described below with reference to FIG. 5), or some combination thereof. The UE category management application 122 can switch dynamically between any of the available UE categories 126. For example, the UE category management application 122 can change the active UE category 124 of the connected car device 102 from a highest available UE category of the available UE categories 126, such as, for example, 3GPP-defined category 12, when the connected car device 102 is operating in a connected mode, and can change to a lowest available UE category of the available UE categories 126, such as, for example, a 3GPP category 0, a 3GPP category 1, a 3GPP category M, or any other lower category that may be proposed in 3GPP standards, when the connected car device 102 is operating in an idle. The UE category management application 122 can change the active UE category 124 based upon other criteria described above.

The connected car application 128 can include any application executable by the connected car device 102 to exchange data via a network, such as the RAN 106 and the EPC 110, in support of one or more M2M services. In some embodiments, the connected car application 128 is configured to communicate with an M2M application server 132 that provides, at least in part, one or more of the M2M services described above. In some embodiments, the connected car application 128 is configured to communicate with one or more external applications/services 134 that provide, at least in part, one or more of the M2M services described above.

The mobility state 130 can include the speed at which the connected car device 102 is currently moving, a movement pattern of the connected car device 102, and/or any other information associated with movement or non-movement of the connected car device 102. The mobility state 130 can be obtained by an accelerometer, global positioning system ("GPS") component, other motion sensor or component of the connected car device 102, or some combination thereof (best shown in FIG. 8). The mobility state 130 can be utilized by the UE category management application 122 to determine the UE category from the available UE categories 126 appropriate for the connected car device 102 given the movement or non-movement of the connected car device 102. The UE category management application 122 can determine if the connected car device 102 is mobile as described by the above procedures (e.g., speed, serving signal strength, Doppler, and/or the like) and enforce a suitable category selection (e.g., select a higher UE category, such as UE category 11, based upon high-definition multi-channel video streaming application and high-speed mobility needs and dynamically alter such selection mechanism based on a combination of application, mobility patterns, connectivity state, and the like) to receive the best performance for a given application.

The M2M application server 132 can be configured in accordance with European Telecommunication Standards Institute ("ETSI") and/or 3GPP standards to provide, at least in part, one or more M2M services. In the illustrated embodiment, the M2M application server 132 is shown external to the EPC 110 and in communication with the MME 112 through a firewall 136. In some other embodiments, the M2M application server 132 can be implemented within the EPC network 110.

In the illustrated embodiment, the connected car device 102 can communicate to the MME 112 a UE capability information element 138 when the connected car device 102 attaches to the MME 112. The UE capability information element 138 can include the active UE category 124 and a UE category switching capability 140 indicative of the connected car device's 102 capability of switching among the available UE categories 126 at the discretion of the UE category management application 122. Moreover, when the UE category management application 122 changes the active UE category 124, the connected car device 102 can generate and send the UE capability information element 138 to the M2M application server 132 via the RAN 106 and the EPC 110. The M2M application server 132, in response, can trigger a push request for data transfer to the connected car device 102 based upon the type/amount of data to be transferred to and/or obtained from the connected car device 102.

The UE capability information element 138 can be relayed directly to the M2M application server 132 either directly or indirectly depending on the amount of data being used. The direct signaling interface between the MME 112 and the M2M application server 132 can facilitate efficient low bandwidth connected car specific communications as opposed to establishing a packet data connection via the SGW/PGW 114 and traversing through the IP network.

Low bandwidth, fast data transmission could be achieved using control plane signaling for the connected car device 102 on-demand. For high-speed data transmission, such as for infotainment and location-based services, the connected car device 102 can establish packet data connections over IP network using specific access point name(s) ("APNs") to be able to receive such services. Data transmission, in this case, occurs from the M2M application server 132 to the connected car device 102 via the PDN 120.

It should be understood that some implementations of the operating environment 100 include multiple connected car devices 102, multiple vehicles, multiple RANs 106, multiple eNBs 108, multiple EPC networks 110, multiple MMEs 112, multiple SGW/PGWs 114, multiple HSSs 116, multiple sets of UE categories 118, multiple PDNs 120, multiple UE category management applications 122, multiple connected car applications 128, multiple mobility states 130, multiple M2M application servers 132, multiple firewalls 136, multiple UE capability information elements 138, or some combination thereof. Thus, the illustrated embodiment should be understood as being illustrative, and should not be construed as being limiting in any way.

Figure 2:
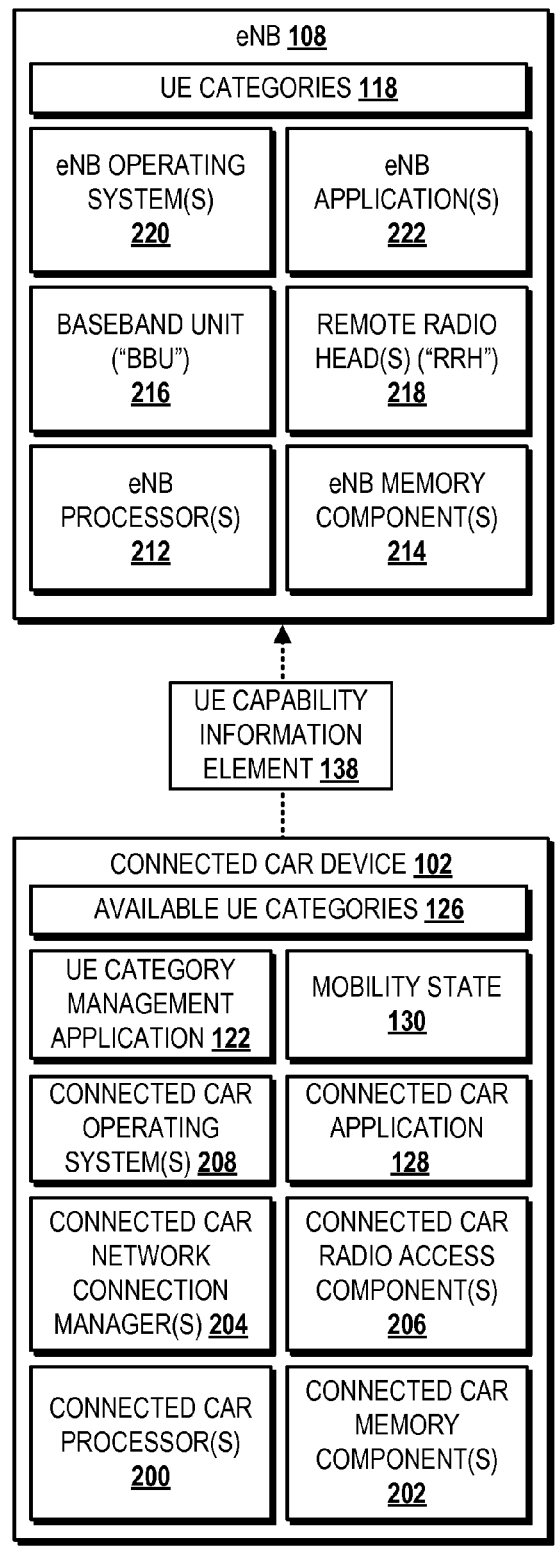
FIG. 2 is a block diagram illustrating aspects of an illustrative connected car device communicating with an illustrative eNB, according to an illustrative embodiment of the concepts and technologies disclosed herein.

Turning now to FIG. 2, a block diagram illustrating additional aspects of the connected car device 102 communicating with the eNB 108 will be described, according to an illustrative embodiment of the concepts and technologies disclosed herein. The illustrated connected car device 102 includes one or more connected car processors 200, one or more connected car memory components 202, one or more connected car network connection managers 204, one or more connected car radio access components 206, one or more connected car device operating systems 208, one or more connected car applications 128, the UE category management application 122, the mobility state 130, and the available UE categories 126. The illustrated eNB 108 includes one or more eNB processors 212, one or more eNB memory components 214, a baseband unit ("BBU") 216, one or more remote radio heads ("RRHs") 218, one or more eNB operating systems 220, and one or more eNB applications 222. The illustrated eNB 108 also includes the UE categories 118. Each of these components will now be described in detail.

The connected car processor 200 can include a central processing unit ("CPU") configured to process data, execute computer-executable instructions of one or more application programs, and communicate with other components of the connected car device 102 in order to perform various functionality described herein. The connected car processor 200 may be utilized to execute aspects of the connected car device operating system 208 and the connected car device application 128. In some embodiments, the connected car processor 200 is, or is included in, a system-on-chip ("SoC") along with one or more of the other components described herein below. For example, the SoC may include the connected car processor 200, a GPU, and the M2M radio access component(s) 206. In some embodiments, the connected car processor 200 is fabricated, in part, utilizing a package-on-package ("PoP") integrated circuit packaging technique. Moreover, the connected car processor 200 may be a single core or multi-core processor. The connected car processor 200 may be created in accordance with an ARM architecture, available for license from ARM HOLDINGS of Cambridge, United Kingdom. Alternatively, the connected car processor 200 may be created in accordance with an x86 architecture, such as is available from INTEL CORPORATION of Mountain View, Calif. and others. In some embodiments, the connected car processor 200 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The connected car memory components 202 can include a random access memory ("RAM"), a read-only memory ("ROM"), an integrated storage memory ("integrated storage"), and a removable storage memory ("removable storage"), or some combination thereof. In some embodiments, the connected car memory components 202 are included as part of the connected car processor 200. In some embodiments, the connected car memory components 202 store the connected car device operating system(s) 208 or a portion thereof (e.g., operating system kernel or bootloader), the connected car application 128, the UE category management application 122, the mobility state 130, and the available UE categories 126.

The connected car network connection manager 204 can manage all or a portion of the network connections available to the connected car device 102 at a given time. The network connections can include, for example, connections established via the connected car radio access components 206, which may be or may include one or more cellular radios and/or other radios suited for the radio access technologies described herein above. In some embodiments, the connected car network connection manager 204 is included as part of the connected car device operating system 208 and/or the connected car device application 128.

The connected car device operating system 208 is a program for controlling the operation of the connected car device 102. The connected car device operating system 208 can include a proprietary operating system, an embedded operating system, a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the OS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The eNB processor 212 can include one or more processing units configured to process data, execute computer-executable instructions of one or more application programs, and communicate with other components of the eNB 108 in order to perform various functionality described herein. The eNB processor 212 may be utilized to execute aspects of the eNB operating system 220 and the eNB application 222. In some embodiments, the eNB processor 212 is or includes a CPU, a communications processor, or a field-programmable gate array ("FPGA"). In some embodiments, the eNB processor 212 is, or is included in, a SoC along with one or more of the other components described herein below. For example, the SoC may include the eNB processor 212, a GPU, the BBU 216, the RRH 218, or some combination thereof. In some embodiments, the eNB processor 212 is fabricated, in part, utilizing a PoP integrated circuit packaging technique. Moreover, the eNB processor 212 may be a single core or multi-core processor. The eNB processor 212 may be created in accordance with an ARM architecture, available for license from ARM HOLDINGS of Cambridge, United Kingdom. Alternatively, the eNB processor 212 may be created in accordance with an x86 architecture, such as is available from INTEL CORPORATION of Mountain View, Calif. and others. In some embodiments, the eNB processor 212 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an OMAP SoC, available from TEXAS INSTRUMENTS of Dallas, Tex., a customized version of any of the above SoCs, or a proprietary SoC.

The eNB memory components 214 can include a RAM, a ROM, an integrated storage memory, and a removable storage memory, or some combination thereof. In some embodiments, the eNB memory components 214 are included as part of the M2M processor 200. In some embodiments, the eNB memory components 214 store the eNB operating system(s) 220 or a portion thereof (e.g., operating system kernel or bootloader), the eNB application(s) 222, and the UE categories 118.

The BBU 216 is the baseband processing unit of the eNB 108. The BBU 216 can include other components shown, including, for example, the eNB processor(s) 212, the eNB memory component(s) 214, the eNB operating system(s) 220, the eNB application(s) 222, or some combination thereof. The BBU 216 can receive IP packets received from the EPC network 110 and can modulate the IP packets into digital baseband signals. The BBU 216 can send the digital baseband signals to the RRH(s) 218. The digital baseband signals received from the RRH(s) 218 are demodulated and IP packets are transmitted to the EPC network 110. The RRH(s) 218 can transmit and receive wireless signals from the M2M device, including a signal carrying the M2M UE category 118, for example. The RRH(s) 218 also convert the digital baseband signals from the BBU 216 that have been subjected to protocol-specific processing into RF signals and power amplifies the signals for transmission to the connected car device 102. The RF signals received from the connected car device 102 are amplified and converted to digital baseband signals for transmission to the BBU 216.

The eNB operating system 220 is a program for controlling the operation of the eNB 108. The eNB operating system 220 can include a proprietary operating system, an embedded operating system, a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The eNB application 222 can be any application that performs operations for the eNB 108. For example, the eNB application 222 can be or can include software compliant with 3GPP standards for call control processing, performance management, self-organizing network functions, and the like.

In the illustrated example, the connected car device 102 provides the UE capability information element 138 when the connected car device 102 attaches to the MME 112. The UE capability information element 138 can include the active UE category 124 and the UE category switching capability 140 indicative of the connected car device's 102 capability of switching among the available UE categories 126 at the discretion of the UE category management application 122. Moreover, when the UE category management application 122 changes the active UE category 124, the connected car device 102 can generate and send the UE capability information element 138 to the M2M application server 132 via the RAN 106 and the EPC 110 (best shown in FIG. 1). The M2M application server 132, in response, can trigger a push request for data transfer to the connected car device 102 based upon the type/amount of data to be transferred to and/or obtained from the connected car device 102.

Figure 3:
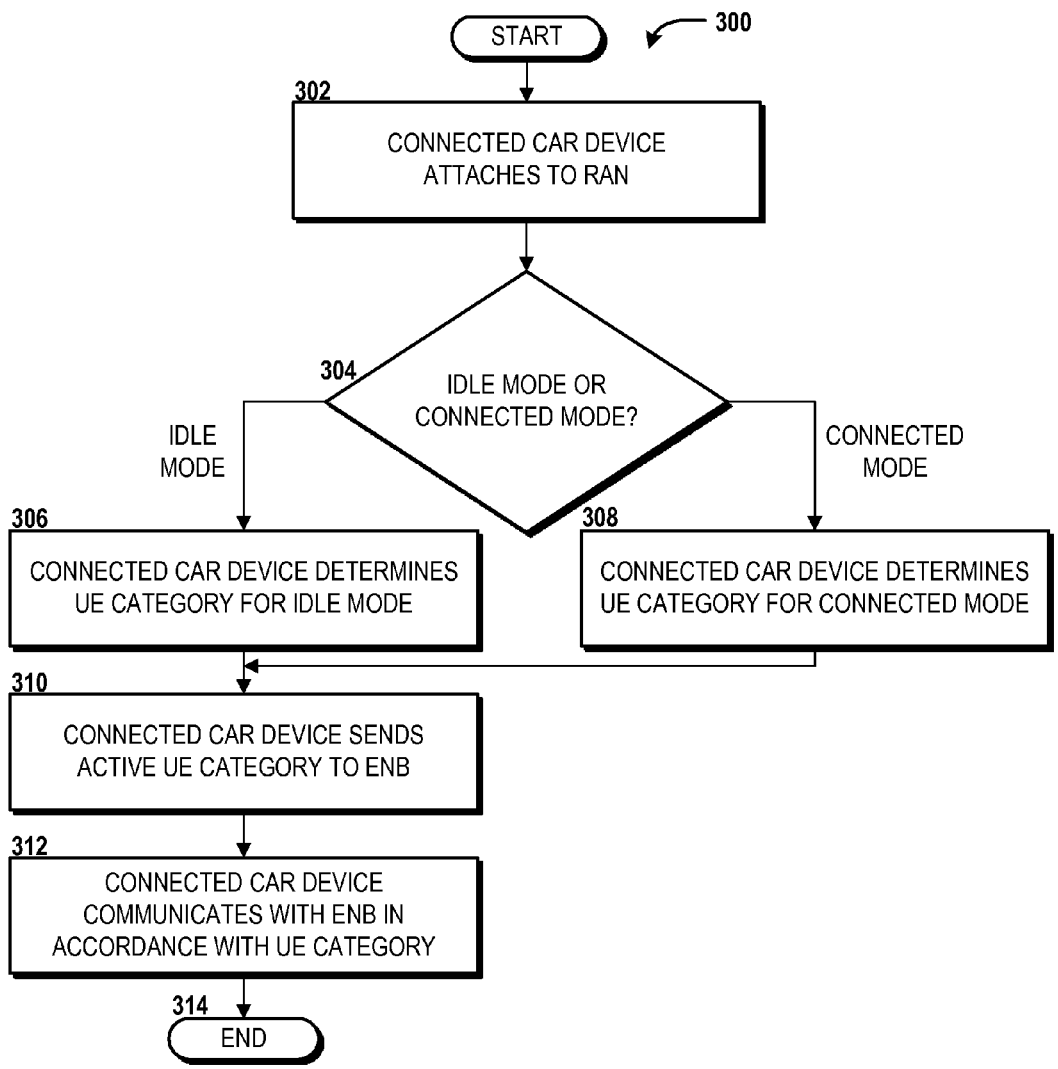
FIG. 3 is a flow diagram illustrating aspects of a method for determining a UE category for connected and idle modes of a connected car device, according to an illustrative embodiment of the concepts and technologies disclosed herein.

Turning now to FIG. 3, a flow diagram illustrating aspects of a method 300 for determining the active UE category 124, such as one of the available UE categories 126, for connected and idle modes of the connected car device 102, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the connected car device 102, the eNB 108, the MME 112, the S/PGW 114, the HSS 116, and/or one or more other computing systems and/or devices disclosed herein to perform operations.

For purposes of illustrating and describing some of the concepts of the present disclosure, the methods disclosed herein are described as being performed, in part, by the connected car device 102, the eNB 108, the MME 112, the S/PGW 114, the HSS 116, or some combination thereof, via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and further reference to FIGS. 1 and 2. The method 300 will be described as being performed by the connected car device 102. The method 300 begins and proceeds to operation 302, where the connected car device 102 attaches to the RAN 106 via one or more eNBs, such as the eNB 108.

From operation 302, the method proceeds to operation 304, where the connected car device 102 determines whether idle mode or connected mode is currently active. The connected car device 102 is in connected mode when the connected car device 102 has at least one radio bearer established. The connected car device 102 is in idle mode when the connected car device 102 has no radio bearers established. The determination at operation 304 can include determining whether an inactivity timer expired, indicating the connected car device 102 is in idle mode or is expected to transition to idle mode.

As used herein, "idle mode" refers to a UE mode in which a UE, such as the connected car device 102, operates in accordance with idle mode procedures defined by 3GPP. As used herein, "connected mode" refers to a UE mode in which a UE, such as the connected car device 102, operates in accordance with connected mode procedures defined by 3GPP.

In response to determining that idle mode is currently active, the method 300 proceeds to operation 306, where the connected car device 102 determines a UE category appropriate for idle mode. In response to determining that connected mode is currently active, the method 300 instead proceeds to operation 308, where the connected car device 102 determines a UE category appropriate for connected mode. For example, the connected car device 102 can execute, via the connected car processor(s) 200, the UE category management application 122 to change the active UE category 124 of the connected car device 102 to a highest available UE category of the available UE categories 126, such as, for example, 3GPP-defined category 12, when the connected car device 102 is operating in connected mode, and can change to a lowest available UE category of the available UE categories 126, such as, for example, a 3GPP category 0, a 3GPP category 1, a 3GPP category M, or any other lower category that may be proposed in 3GPP standards, when the connected car device 102 is operating in idle mode.

From operation 306 or operation 308, the method 300 proceeds to operation 310, where the connected car device 102 sends the UE category (i.e., the new active UE category) determined at either operation 306 or operation 308 to the eNB 108. From operation 310, the method 300 proceeds to operation 312, where the connected car device 102 communicates with the eNB 108 in accordance with the UE category. From operation 312, the method 300 proceeds operation 314, where the method 300 ends.

Figure 4:
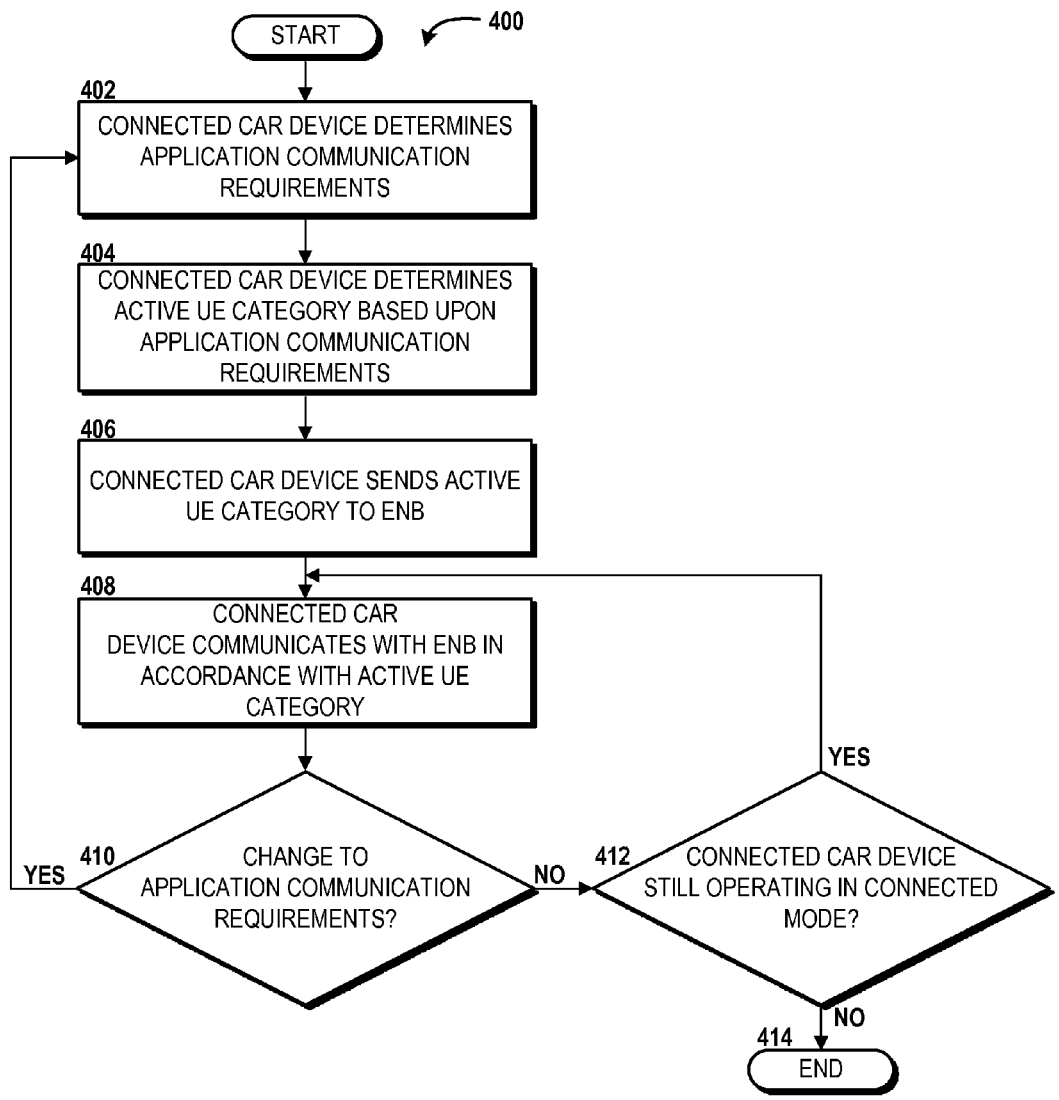
FIG. 4 is a flow diagram illustrating aspects of a method for determining a UE category for a connected car device based upon application communication requirements, according to an illustrative embodiment of the concepts and technologies disclosed herein.

Turning now to FIG. 4, a method 400 for determining the active UE category 124 for the connected car device 102 based upon application communication requirements will be described, according to an illustrative embodiment of the concepts and technologies disclosed herein. The method 400 can be performed as operations performed at operation 308 described herein above with reference to FIG. 3.

The method 400 will be described with reference to FIG. 4 and further reference to FIGS. 1 and 2. The method 400 will be described as being performed by the connected car device 102. The method 400 begins and proceeds to operation 402, where the connected car device 102 determines one or more application communication requirements of the connected car application 128 executing on or to be executed on (e.g., one or more operations scheduled in memory such as the connected car memory component 202) the connected car device 102. Examples of communication applications include, but are not limited to, voice call, video call, conferencing, IP messaging, texting, on-demand broadcast audio/video streaming, emergency updates, and the like, each having unique requirements for quality. From operation 402, the method 400 proceeds to operation 404, where the connected car device 102 determines an appropriate UE category based upon the application communication requirement(s). From operation 404, the method 400 proceeds to operation 406, where the connected car device 102 sends the appropriate UE category determined at operation 404 to the eNB 108. From operation 406, the method 400 proceeds to operation 408, where the connected car device 102 communicates with the eNB 108 in accordance with the appropriate UE category.

From operation 408, the method 400 proceeds to operation 410, where connected car device 102 determines whether there has been a change to the application communication requirement(s). A change to the application communication requirement(s) can be a change of communication requirements within the same application or a change instigated by additional applications. If the connected car device 102 determines that there has been a change to the application communication requirement(s), the method 400 returns to operation 402. If, however, the connected car device 102 determines that there has not been a change to the application communication requirement(s), the method 400 proceeds to operation 412, where the connected car device 102 determines whether it is still operating in connected mode. If the connected car device 102 is still operating in connected mode, the method 400 returns to operation 408. If, however the connected car device 102 is not still operating in connected mode, the method 400 proceeds to operation 414, where the method 400 ends.

Figure 5:
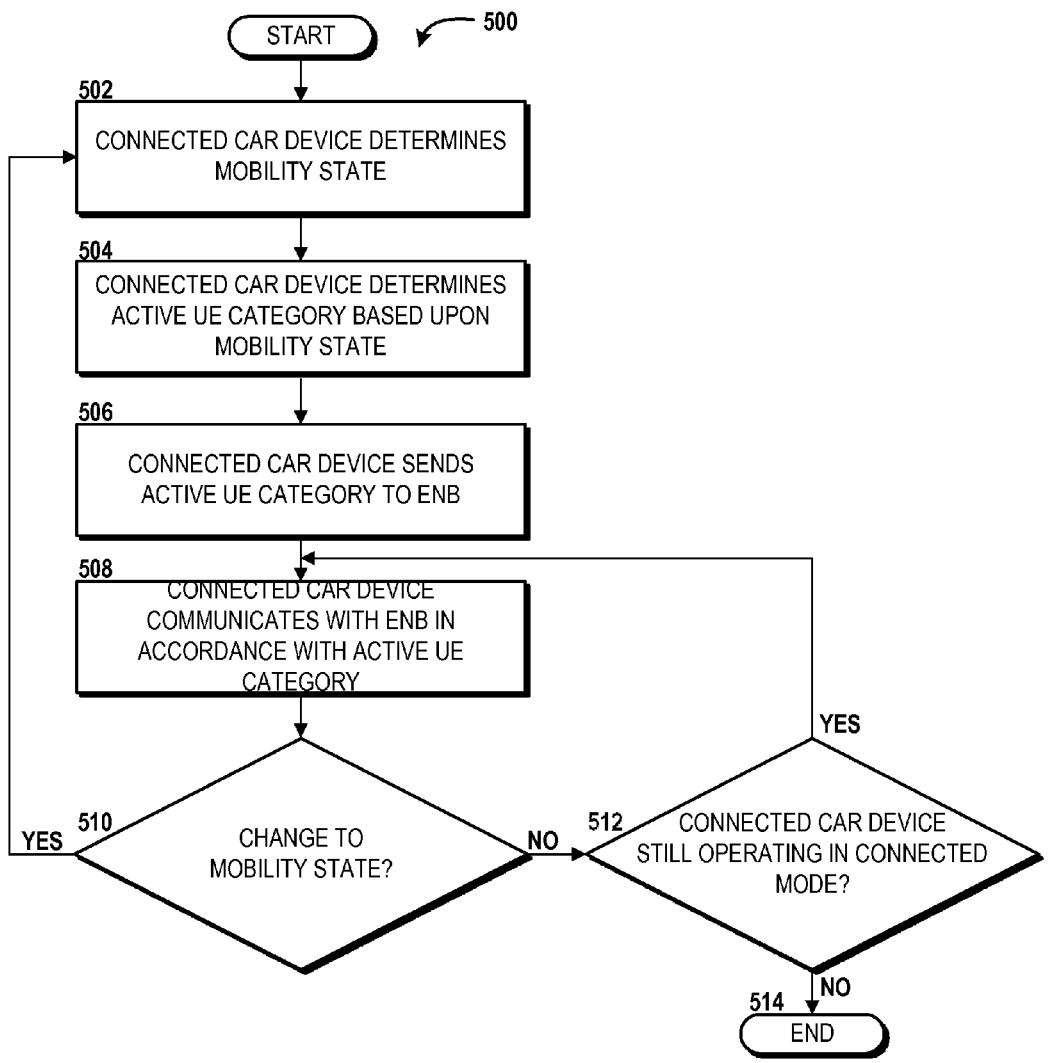
FIG. 5 is a flow diagram illustrating aspects of a method for determining a UE category for a connected car device based upon a mobility state of the connected car device, according to an illustrative embodiment of the concepts and technologies disclosed herein.

Turning now to FIG. 5, a flow diagram illustrating aspects of a method 500 for determining the active UE category 124 for the connected car device 102 based upon the mobility state 130 of the connected car device 102 will be described, according to an illustrative embodiment of the concepts and technologies disclosed herein. The method 500 can be performed as operations performed at operation 308 described herein above with reference to FIG. 3.

The method 500 will be described with reference to FIG. 5 and further reference to FIGS. 1 and 2. The method 500 begins and proceeds to operation 502, where the connected car device 102 determines the mobility state 130 of the connected car device 102. From operation 502, the method 500 proceeds to operation 504, where the connected car device 102 determines the active UE category 124 based upon the mobility state 130. For example, if the connected car device 102 is in idle mode or has transitioned from a connected mode to an idle mode and is stationary, select or dynamically transition to a lower UE category, such as category 1 or category 0 or category M or any other lower category as defined in 3GPP standards, based upon device type, identity, and supported categories as well as applications. From operation 504, the method 500 proceeds to operation 506, where the connected car device 102 sends the active UE category 124 determined at operation 504 to the eNB 108. From operation 506, the method 500 proceeds to operation 508, where the connected car device 102 communicates with the eNB 108 in accordance with the active UE category 124.

From operation 508, the method 500 proceeds to operation 510, where connected car device 102 determines whether there has been a change to the mobility state 130. If the connected car device 102 determines that there has been a change to the mobility state 130, the method 500 returns to operation 502. If the connected car device 102 determines that there has not been a change to the mobility state 130, the method 500 proceeds to operation 512, where the connected car device 102 determines whether it is still operating in connected mode. If the connected car device 102 is still operating in connected mode, the method 500 returns to operation 508. If, however the connected car device 102 is not still operating in connected mode, the method 500 proceeds to operation 514, where the method 500 ends.

Figure 6:
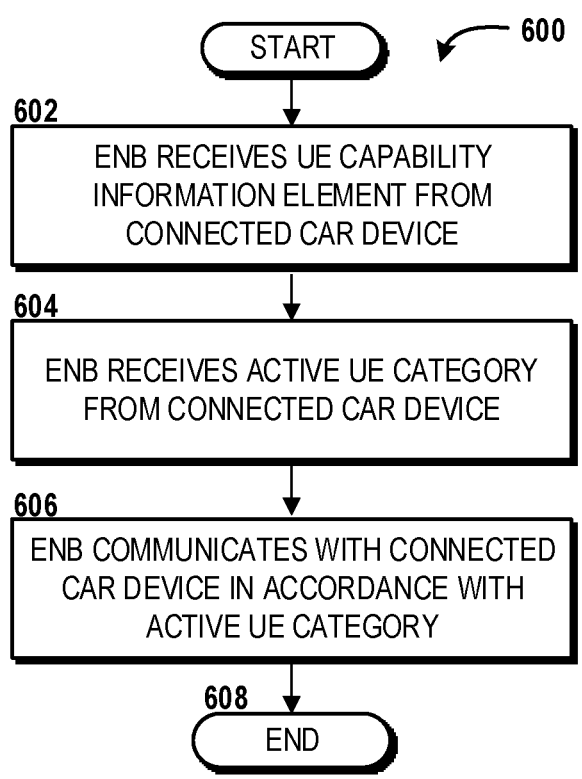
FIG. 6 is a flow diagram illustrating aspects of a method for operating an eNB, according to an illustrative embodiment of the concepts and technologies disclosed herein.

Turning now to FIG. 6, a flow diagram illustrating aspects of a method 600 for operating an eNB will be described, according to an illustrative embodiment of the concepts and technologies disclosed herein. The method 600 begins and proceeds to operation 602, where the eNB 108 receives the UE capability information element 138 from the connected car device 102. From operation 602, the method 600 proceeds to operation 604, where the eNB 108 receives the active UE category 124 in the UE capability information element 138 from the connected car device 102. From operation 604, the method proceeds to operation 606, where the eNB 108 communicates with the connected car device 102 in accordance with the active UE category 124 received at operation 604. From operation 606, the method 600 proceeds to operation 608, where the method 600 ends.

Figure 7:
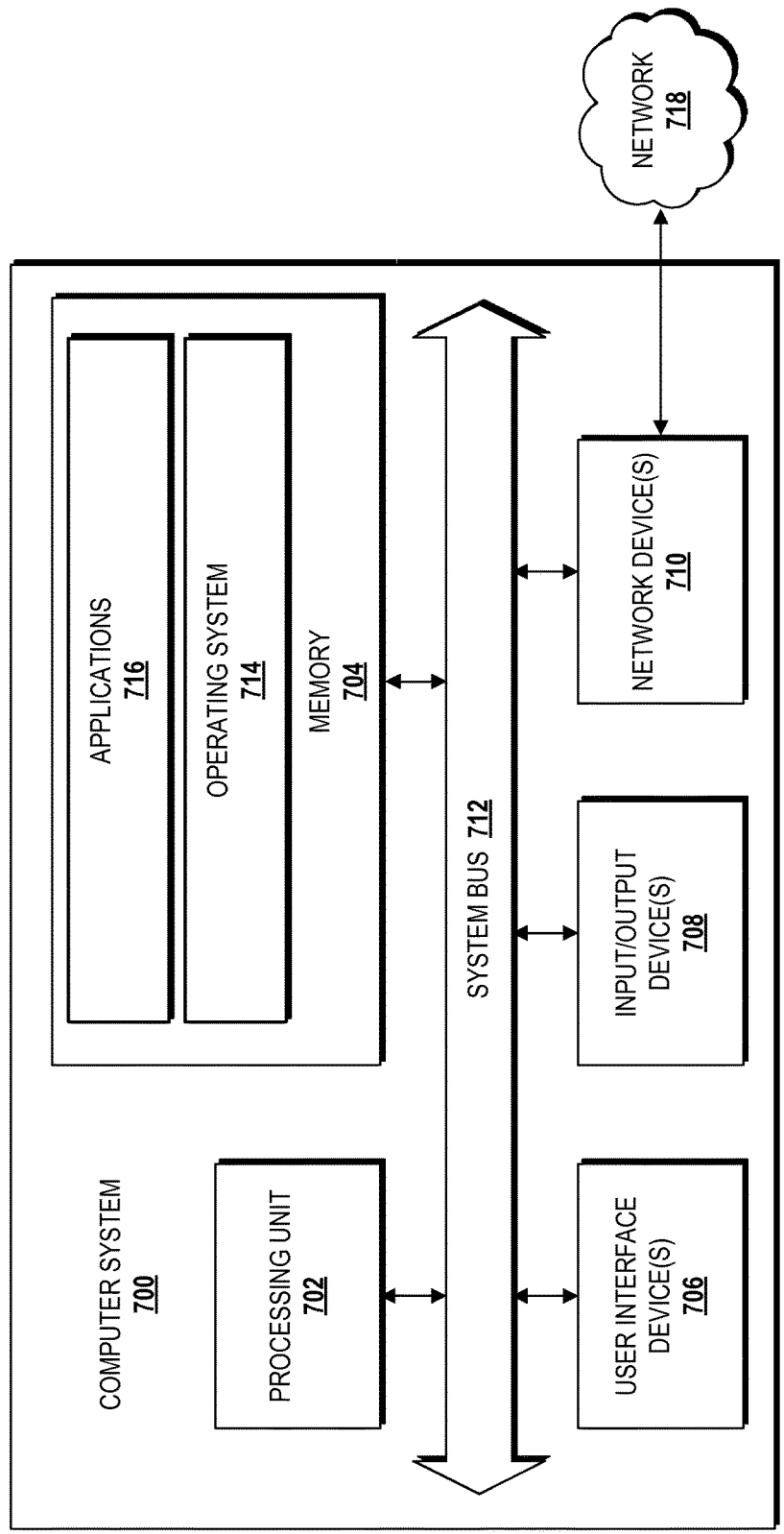
FIG. 7 is a block diagram illustrating an example computer system capable of implementing aspects of the embodiments presented herein.

FIG. 7 is a block diagram illustrating a computer system 700 configured to perform various operations disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 enables bi-directional communication between the processing unit 702, the memory 704, the user interface devices 706, the I/O devices 708, and the network devices 710. In some embodiments, the connected car device 102, one or more components of the RAN 106, the eNB 108, one or more components of the EPC network 110 (e.g., the MME 112, the S/PGW 114, and/or the HSS 116), one or more components of the PDN 120, or some combination thereof is/are configured, at least in part, like the computer system 700. It should be understood, however, that the connected car device 102, one or more components of the RAN 106, the eNB 108, one or more components of the EPC network 110 (e.g., the MME 112, the S/PGW 114, and/or the HSS 116), and/or one or more components of the PDN 120 may include additional functionality or include less functionality than now described.

The processing unit 702 may be a standard central processor that performs arithmetic and logical operations, a more specific purpose programmable logic controller ("PLC"), a programmable gate array, or other type of processor known to those skilled in the art and suitable for controlling the operation of the computer system 700. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more applications 716.

The operating system 714 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 706 may include one or more devices with which a user accesses the computer system 700. The user interface devices 706 may include, but are not limited to, computers, servers, personal digital assistants, telephones (e.g., cellular, IP, or landline), or any suitable computing devices. The I/O devices 708 enable a user to interface with the program modules. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network 718. Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a WLAN such as a WI-FI network, a WWAN, a wireless PAN ("WPAN") such as BLUETOOTH, or a wireless MAN ("WMAN"). Alternatively, the network 718 may be a wired network such as, but not limited to, a WAN such as the Internet, a LAN such as the Ethernet, a wired PAN, or a wired MAN. The network 718 can be or can include the RAN 106.

Figure 8:
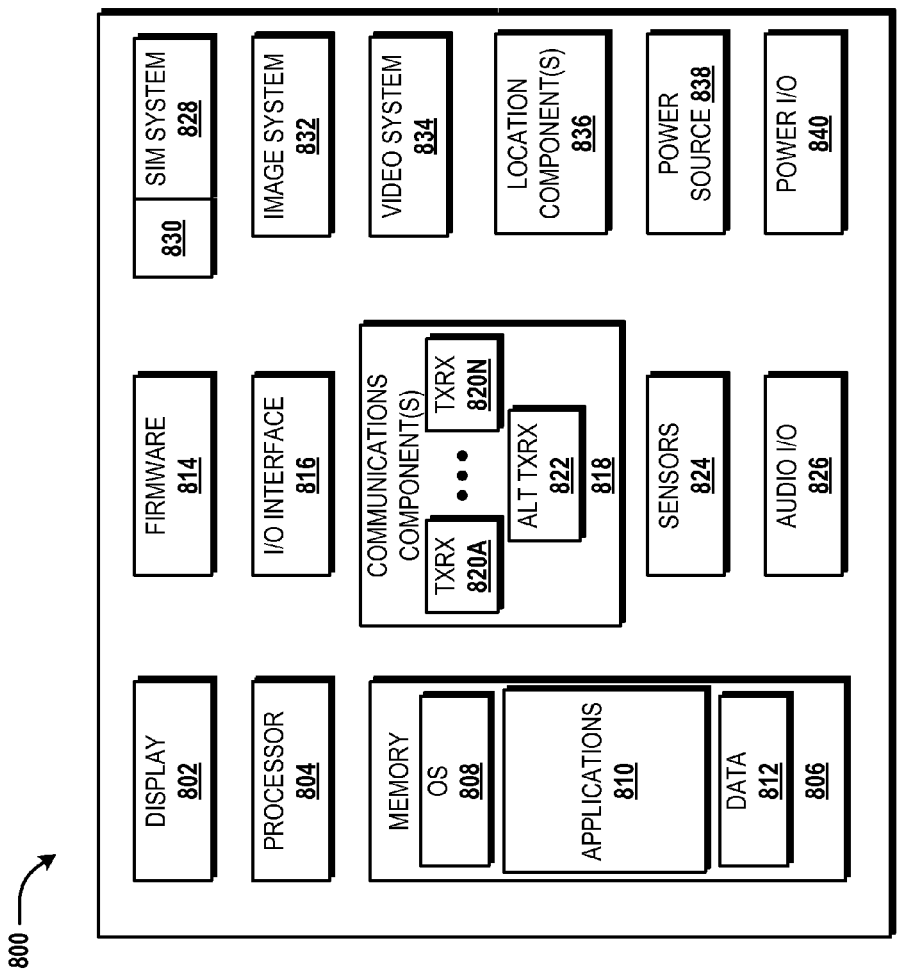
FIG. 8 is a block diagram illustrating an example connected car device capable of implementing aspects of the embodiments disclosed herein.

Turning now to FIG. 8, an illustrative connected car device 800 and components thereof will be described. In some embodiments, the connected car device 102 described above with reference to FIGS. 1 and 2 can be configured as and/or can have an architecture similar or identical to the connected car device 800 described herein in FIG. 8. It should be understood, however, that the connected car device 102 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the connected car device 800 can include a display 802 for displaying data. According to various embodiments, the display 802 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The connected car device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, which may include the connected car applications(s) 128, the UE category management application 102, other computer-executable instructions stored in the memory 806, or the like. In some embodiments, the applications 810 also can include a UI application (not illustrated in FIG. 8).

The UI application can interface with the operating system 808, such as the connected car device operating system 208 shown in FIG. 2, to facilitate user interaction with functionality and/or data stored at the connected car device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in data communications, entering/deleting data, entering and setting user IDs and passwords for device access, configuring settings, manipulating content and/or settings, multimode interaction, interacting with other applications 810, and otherwise facilitating user interaction with the operating system 808, the applications 810, and/or other types or instances of data 812 that can be stored at the connected car device 800. The data 812 can include, for example, the available UE categories 126, the mobility state 130, and/or other data.

According to various embodiments, the applications 810 can include, for example, the connected car application 128, the UE category management application 122, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The connected car device 800 also can include an input/output ("I/O") interface 816. The I/O interface 816 can be configured to support the input/output of data such as location information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the connected car device 800 can be configured to synchronize with another device to transfer content to and/or from the connected car device 800. In some embodiments, the connected car device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the connected car device 800 and a network device or local device.

The connected car device 800 also can include a communications component 818, such as the connected car radio access component(s) 206. The communications component 818 can be configured to interface with the processor 804 to facilitate wired and/or wireless communications with one or more networks such as the RAN 106 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments, one or more of the transceivers of the communications component 818 may be configured to communicate using GSM, CDMAONE, CDMA2000, LTE, and various other 2G, 2.5G, 3G, 4G, 4.5G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The connected car device 800 also can include one or more sensors 824. The sensors 824 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the connected car device 800 may be provided by an audio I/O component 826. The audio I/O component 826 of the connected car device 800 can include one or more speakers for the output of audio signals, one or more microphones for the collection and/or input of audio signals, and/or other audio input and/or output devices.

The illustrated connected car device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards.

Because other devices and/or modules for identifying users and/or the connected car device 800 are contemplated, it should be understood that these embodiments are illustrative, and should not be construed as being limiting in any way.

The connected car device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The connected car device 800 may also include a video system 834. The video system 834 can be configured to capture, process, record, modify, and/or store video content. Photos and videos obtained using the image system 832 and the video system 834, respectively, may be added as message content to an MMS message, email message, and sent to another connected car device. The video and/or photo content also can be shared with other devices via various types of data transfers via wired and/or wireless communication devices as described herein.

The connected car device 800 also can include one or more location components 836. The location components 836 can be configured to send and/or receive signals to determine a geographic location of the connected car device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the connected car device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the connected car device 800. Using the location component 836, the connected car device 800 can generate and/or receive data to identify its geographic location, or to transmit data used by other devices to determine the location of the connected car device 800. The location component 836 may include multiple components for determining the location and/or orientation of the connected car device 800.

The illustrated connected car device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the connected car device 800 can include additional and/or alternative components, the above embodiment should be understood as being illustrative of one possible operating environment for various embodiments of the concepts and technologies described herein. The described embodiment of the connected car device 800 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the connected car device 800 or other devices or computers described herein, such as the computer system 700 described above with reference to FIG. 7. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the connected car device 800 in order to store and execute the software components presented herein. It is also contemplated that the connected car device 800 may not include all of the components shown in FIG. 8, may include other components that are not explicitly shown in FIG. 8, or may utilize an architecture completely different than that shown in FIG. 8.

Figure 9:
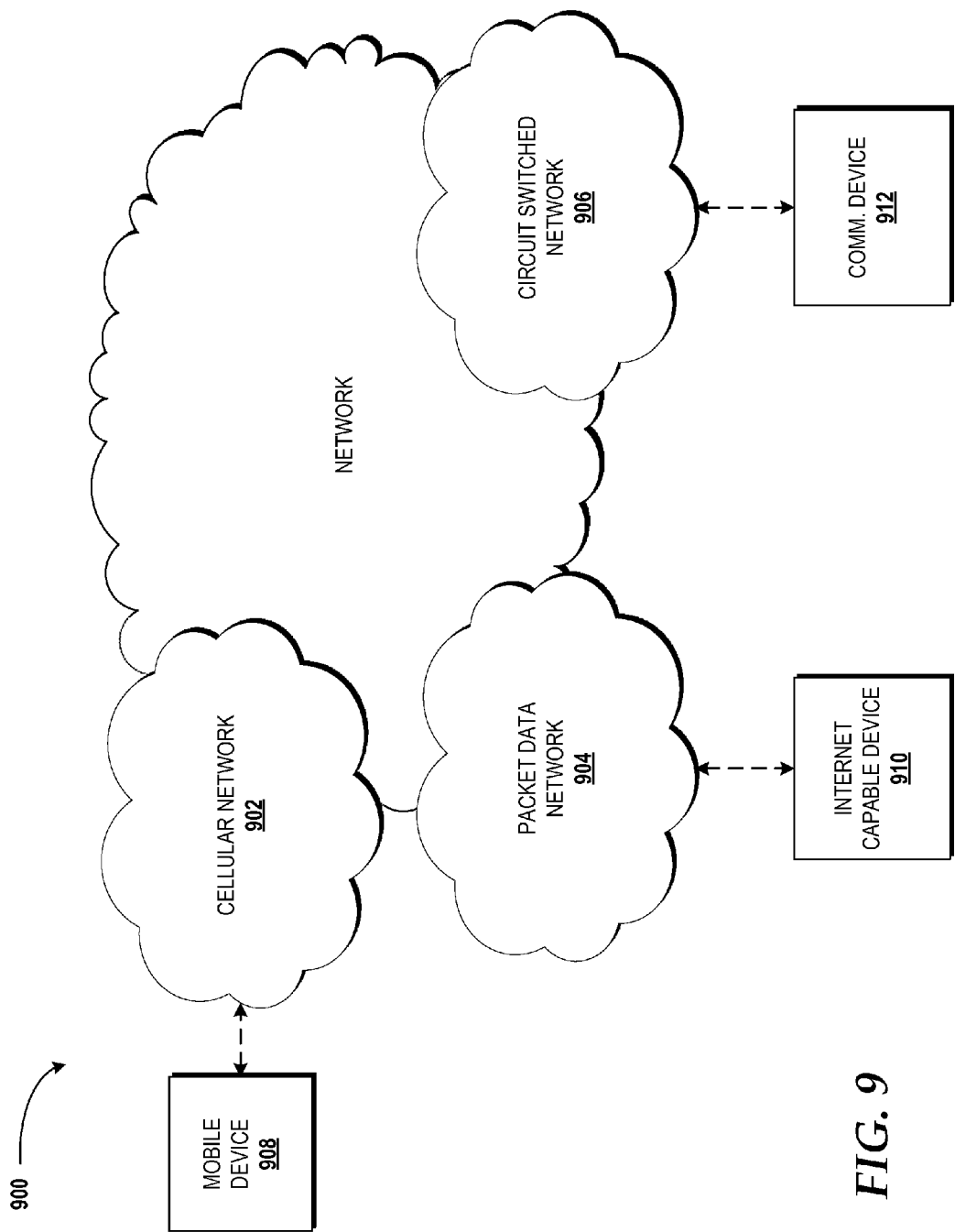
FIG. 9 is a diagram illustrating a network, according to an illustrative embodiment.

Turning now to FIG. 9, details of a network 900 are illustrated, according to an illustrative embodiment. The network 900 includes a cellular network 902 (e.g., the RAN 106 and the EPC network 110), a packet data network 904 (e.g., the PDN 120), and a circuit switched network 906 (e.g., a public switched telephone network). The network 900 can include the operating environment 100 illustrated and described with reference to FIG. 1.

The cellular network 902 includes various components such as, but not limited to, BTSs, Node-Bs or e-Node-Bs (e.g., the eNB 108), base station controllers ("BSCs"), radio network controllers ("RNCs"), mobile switching centers ("MSCs"), MMEs (e.g., the MME 112), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 902 also includes radios and nodes for receiving and transmitting voice, data, and combinations thereof to and from radio transceivers, networks, the packet data network 904, and the circuit switched network 906. The cellular network 902 can include the RAN 106.

A mobile communications device 906, such as, for example, a cellular telephone, a UE, a mobile terminal, a PDA, a laptop computer, a handheld computer, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards such as LTE, or the like, as well as evolved and future mobile standards.

The packet data network 904 can include the PDN 120. The packet data network 904 includes various devices, for example, servers, computers, databases, and other devices in communication with one another, as is generally known. In some embodiments, the packet data network 904 is or includes one or more WI-FI networks, each of which can include one or more WI-FI access points, routers, switches, and other WI-FI network components. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system ("POTS"). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, the connected car device 102, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910.

Based on the foregoing, it should be appreciated that concepts and technologies for dynamically switching UE categories for adaptive mobile communications have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A connected car device comprising:
    a processor; and
    a memory that stores a user equipment management application that, when executed by the processor, causes the processor to perform operations comprising
        determining whether the connected car device is operating in an idle mode or a connected mode,
        in response to determining that the connected car device is operating in the connected mode, determining an application communication requirement of a connected car application,
        determining an active user equipment category for the connected car device from a set of available user equipment categories based upon the application communication requirement, and
        sending the active user equipment category to a base station.

2. The connected car device of claim 1, wherein the operations further comprise, in response to determining that the connected car device is operating in the idle mode, determining the active user equipment category to be a lowest available user equipment category in the set of available user equipment categories.

3. The connected car device of claim 2, wherein the lowest available user equipment category comprises a Third Generation Partnership Project category 0 or a Third Generation Partnership Project category 1.

4. The connected car device of claim 1, wherein determining the active user equipment category for the connected car device from the set of available user equipment categories based upon the application communication requirement comprises determining the active user equipment category to be a highest available user equipment category in the set of available user equipment categories.

5. The connected car device of claim 4, wherein the highest available user equipment category comprises a Third Generation Partnership Project category 12.

6. The connected car device of claim 1, wherein the operations further comprise, in response to determining that the connected car device is operating in the connected mode, determining a mobility state of the connected car device; and wherein determining the active user equipment category for the connected car device from the set of available user equipment categories is further based upon the mobility state.

7. The connected car device of claim 1, wherein the operations further comprise:
   determining whether there has been a change to the application communication requirement; and
   in response to determining there has been a change to the application communication requirement, determining a new active user equipment category for the connected car device from the set of available user equipment categories based upon the change to the application communication requirement.

8. The connected car device of claim 7, wherein the change to the application communication requirement is based upon the connected car application.

9. The connected car device of claim 7, wherein the change to the application communication requirement is based upon another connected car application.

10. A computer-readable storage medium comprising instructions that, when executed by a processor of a connected car device, cause the processor to perform operations comprising:
    determining whether the connected car device is operating in an idle mode or a connected mode;
    in response to determining that the connected car device is operating in the connected mode,
      determining an application communication requirement of a connected car application, or
      determining a mobility state of the connected car device;
    determining an active user equipment category for the connected car device from a set of available user equipment categories based upon the application communication requirement or the mobility state; and
    sending the active user equipment category to a base station.

11. The computer-readable storage medium of claim 10, wherein the operations further comprise, in response to determining that the connected car device is operating in the idle mode, determining the active user equipment category to be a lowest available user equipment category in the set of available user equipment categories.

12. The computer-readable storage medium of claim 11, wherein the lowest available user equipment category comprises a Third Generation Partnership Project category 0 or a Third Generation Partnership Project category 1.

13. The computer-readable storage medium of claim 10, wherein determining the active user equipment category for the connected car device from the set of available user equipment categories based upon the application communication requirement or the mobility state comprises determining the active user equipment category to be a highest available user equipment category in the set of available user equipment categories.

14. The computer-readable storage medium of claim 13, wherein the highest available user equipment category comprises a Third Generation Partnership Project category 12.

15. A connected car device comprising:
    a processor; and
    a memory that stores a user equipment management application that, when executed by the processor, causes the processor to perform operations comprising
      determining whether the connected car device is operating in an idle mode or a connected mode,
      in response to determining that the connected car device is operating in the connected mode, determining a mobility state of the connected car device,
      determining an active user equipment category for the connected car device from a set of available user equipment categories based upon the mobility state of the connected car device, and
      sending the active user equipment category to a base station.

16. The connected car device of claim 15, wherein the operations further comprise, in response to determining that the connected car device is operating in the idle mode, determining the active user equipment category to be a lowest available user equipment category in the set of available user equipment categories.

17. The connected car device of claim 16, wherein the lowest available user equipment category comprises a Third Generation Partnership Project category 0 or a Third Generation Partnership Project category 1.

18. The connected car device of claim 15, wherein determining the active user equipment category for the connected car device from the set of available user equipment categories based upon the application communication requirement comprises determining the active user equipment category to be a highest available user equipment category in the set of available user equipment categories.

19. The connected car device of claim 18, wherein the highest available user equipment category comprises a Third Generation Partnership Project category 12.

20. The connected car device of claim 15, wherein the operations further comprise, in response to determining that the connected car device is operating in the connected mode, determining an application communication requirement of a connected car application; and wherein determining the active user equipment category for the connected car device from the set of available user equipment categories is further based upon the application communication requirement.

* * * * *